United States Patent
Mende (10) Patent No.: US 10,192,431 B2
(45) Date of Patent: Jan. 29, 2019

(54) SENSOR DEVICE

(71) Applicant: S.M.S SMART MICROWAVE SENSORS GMBH, Braunschweig (DE)

(72) Inventor: Ralph Mende, Braunschweig (DE)

(73) Assignee: S.M.S SMART MICROWAVE SENSORS GMBH, Braunschweig (DE)

( * ) Notice: Subject to any disclaimer, the term of this patent is extended or adjusted under 35 U.S.C. 154(b) by 0 days.

(21) Appl. No.: 15/113,939

(22) PCT Filed: Jan. 29, 2015

(86) PCT No.: PCT/EP2015/000168
§ 371 (c)(1),
(2) Date: Jul. 25, 2016

(87) PCT Pub. No.: WO2015/113765
PCT Pub. Date: Aug. 6, 2015

(65) Prior Publication Data
US 2016/0343248 A1 Nov. 24, 2016

(30) Foreign Application Priority Data

Jan. 31, 2014 (EP) .................................. 14000369

(51) Int. Cl.
| | |
|---|---|
| *G08G 1/04* | (2006.01) |
| *G08G 1/01* | (2006.01) |
| *G01S 7/40* | (2006.01) |
| *G01S 13/91* | (2006.01) |
| *G01S 13/87* | (2006.01) |
| *H04L 29/08* | (2006.01) |

(52) U.S. Cl.
CPC .......... *G08G 1/0116* (2013.01); *G01S 7/4026* (2013.01); *G01S 13/87* (2013.01); *G01S 13/91* (2013.01); *G08G 1/04* (2013.01); *H04L 67/12* (2013.01); *G01S 2007/403* (2013.01); *G01S 2007/4034* (2013.01)

(58) Field of Classification Search
CPC ...... G08G 1/0116; G08G 1/04; G01S 7/4026; G01S 13/87; G01S 13/91; G01S 2007/403; G01S 2007/4034; H04L 67/12
USPC .......................................................... 340/943
See application file for complete search history.

(56) References Cited

U.S. PATENT DOCUMENTS 6,338,022 B1 * 1/2002 Shinmura .............. B62D 6/003
701/301
9,135,816 B2 * 9/2015 Chung ..................... G08G 1/04
(Continued)

FOREIGN PATENT DOCUMENTS

DE 19751004 A1 5/1999
DE 102011100628 A1 11/2011
(Continued)

*Primary Examiner* — Kerri L McNally
*Assistant Examiner* — Thang D Tran
(74) *Attorney, Agent, or Firm* — W&C IP (57) ABSTRACT

A sensor device (4) is designed to detect road users along a stretch of a roadway and comprises a transmission and/or reception unit for emitting and/or receiving a transmission radiation. Said sensor device (4) is characterized in that the same includes at least one ascertainment unit for ascertaining an actual position and/or an actual orientation of the sensor device (4).

14 Claims, 3 Drawing Sheets

(56) References Cited

U.S. PATENT DOCUMENTS

| | | | |
|---|---|---|---|
| 2002/0003489 A1* | 1/2002 | Samukawa | G01S 17/42 342/70 |
| 2002/0014971 A1 | 2/2002 | Ferraro | |
| 2004/0098224 A1* | 5/2004 | Takahashi | G01S 7/4026 702/181 |
| 2004/0257244 A1* | 12/2004 | Kubota | B62D 15/0285 340/932.2 |
| 2005/0183275 A1* | 8/2005 | Kwon | G01C 17/30 33/361 |
| 2005/0219530 A1* | 10/2005 | Horibe | G01S 7/4972 356/399 |
| 2006/0074546 A1* | 4/2006 | DeKock | G08G 1/01 701/117 |
| 2007/0096943 A1* | 5/2007 | Arnold | G01S 13/34 340/907 |
| 2008/0036857 A1* | 2/2008 | Shimazaki | G06T 3/00 348/113 |
| 2009/0002222 A1* | 1/2009 | Colburn | G01C 9/00 342/145 |
| 2009/0125630 A1* | 5/2009 | Gogic | H04J 11/0086 709/227 |
| 2010/0202032 A1* | 8/2010 | Friese | G02B 26/103 359/226.1 |
| 2010/0241274 A1* | 9/2010 | Ohtera | B25J 9/1075 700/245 |
| 2011/0007157 A1 | 1/2011 | Sekelsky et al. | |
| 2012/0105252 A1* | 5/2012 | Wang | E01F 11/00 340/936 |
| 2013/0060521 A1* | 3/2013 | Shimizu | G01D 5/2013 702/155 |
| 2013/0151135 A1* | 6/2013 | Aubrey | G08G 1/0116 701/118 |
| 2013/0154870 A1 | 6/2013 | Mills et al. | |
| 2013/0218398 A1* | 8/2013 | Gandhi | B60R 16/02 701/31.1 |
| 2013/0232877 A1* | 9/2013 | Tiekoetter | E05F 1/1276 49/138 |
| 2013/0300583 A1* | 11/2013 | Wignot | G01S 13/91 340/907 |
| 2014/0039722 A1* | 2/2014 | Kondoh | B60W 40/09 701/1 |
| 2014/0163775 A1* | 6/2014 | Metzler | G01C 15/002 701/2 |
| 2014/0232566 A1* | 8/2014 | Mimeault | G01S 17/023 340/935 |
| 2015/0036753 A1* | 2/2015 | Kotaka | H04N 19/51 375/240.18 |
| 2015/0070207 A1* | 3/2015 | Millar | G01S 13/006 342/174 |
| 2015/0194059 A1* | 7/2015 | Starr | G06F 3/0484 701/3 |

FOREIGN PATENT DOCUMENTS

| | | |
|---|---|---|
| DE | 102011115323 A1 | 4/2012 |
| EP | 2482267 A1 | 8/2012 |
| JP | 2004147374 | 5/2004 |

\* cited by examiner

SENSOR DEVICE

BACKGROUND OF THE INVENTION

Field of the Invention

The invention concerns a sensor device that is configured to detect road users on a part of a traffic route, wherein the sensor device comprises a transmitting and/or receiving device for transmitting and/or receiving a transmission beam.

Background Description

Such sensor devices have now been known from the state of the art for a long time and are used for example for traffic monitoring on many busy traffic routes, for example at crossings. The sensor devices can however also be used for monitoring shipping routes, for example canals or locks, or for monitoring a part of an air space, for example in the surroundings of wind power systems. In a common configuration of the sensor device, a transmission beam, which for example can consist of radar radiation or ultrasonic waves, is transmitted by the transmitting device. At least part of said transmitted transmission beam is reflected by road users that are located on the monitored part of the traffic route and is incident on the receiving device of the sensor device. As a result, part of the reflected transmission beam can be received, so that the position and the speed of the road user from which the transmitted transmission beam was reflected can be concluded.

In order for example to be able to optimally monitor road crossings that may have a plurality of vehicle lanes for each direction, in many cases a plurality of said conventional sensor devices are necessary. So that as few sensor devices as possible have to be used, the optimum target positions and target orientations of said sensor devices are determined in advance, for example by means of a three-dimensional model of the traffic route that is to be monitored. If the sensor device is subsequently positioned accordingly by an installer in the target position and the target orientation, the part of the traffic route that is allocated thereto is monitored by the sensor device in the desired manner and the road users that are located on said part of the traffic route are detected.

The sensor device is commonly positioned in the target position thereof above or next to the traffic route, for example on a mast of a traffic light or road sign, for which purpose the traffic route must be at least partly closed to traffic. It is also known to position the sensor device on tensioned cables, for example approximately centrally above a crossing of two roads. If deviations from the target position and/or the target orientation occur during the positioning and arrangement of the sensor devices, this has serious effects on the operation of the sensor device, because for example road users will enter the detection region of the sensor device too late or will exit said region too soon. In the event of a deviation of an actual orientation from the target orientation, it is also possible that the desired part of the traffic route is not monitored by the sensor device, so that not all road users may be able to be detected. Said position error or orientation error is however only able to be detected after the actual orientation and/or the actual position has/have been determined in a process that is frequently performed manually.

SUMMARY OF THE INVENTION

The object of the invention is to further develop a sensor device so that the correct arrangement of the sensor device at a suitable position is possible as simply, rapidly and reliably as possible.

The invention achieves the stated object with a sensor device configured to detect road users on a part of a traffic route, which is characterized in that the sensor device comprises at least one determination device for determining an actual position and/or an actual orientation in which the sensor device is disposed.

In an advantageous configuration, the at least one determination device is a GPS module for determining the actual position. Of course, modules of other satellite-based position determination systems or other systems for determining the actual position can also be used. Thus for example, determination of the actual position by means of a cellular network is also possible. However, the use of a GPS module has the advantage that the actual position can be determined with high accuracy, for example with a deviation of only a few centimeters.

The sensor device preferably comprises a provision device for providing the actual position and/or the actual orientation for further processing. One such provision device can for example be a display on which the actual position and/or the actual orientation is/are displayed and can thus be detected by and further processed by a technician that is fitting the sensor device for example. The technician or fitter can compare the determined actual position and/or actual orientation with target data, for example, and may carry out changes to the orientation and/or the position of the sensor device.

However, the provision device can for example be present in the form of a communications device, which can for example transmit the data wirelessly or by cable to a device for further processing. This can take place by radio, cellular system or WLAN or other communications channels. The device for further processing is for example an electronic data processing device, for example a computer, which receives the data regarding the actual position and/or actual orientation and may process it further.

In one advantageous configuration of the sensor device, the sensor device comprises an electrical controller that is configured to compare the actual position with a target position and/or the actual orientation with a target orientation. The electrical controller is for example in the form of a microprocessor for electronic data processing in this case.

It has been found to be particularly advantageous if the electrical controller is configured to obtain the target position and/or the target orientation from an electrical data memory. Said memory is advantageously part of the sensor device. Alternatively or additionally, an external electronic data memory can also be provided, to which the electrical controller has access, for example by means of wireless communications channels, for example WLAN, Bluetooth or radio.

Consequently, the target position and/or the target orientation are stored in the electronic data memory of the sensor device. Owing to the determination device, the sensor device is able, following the positioning in an actual position and an actual orientation, to determine at least one of said variables and to compare the same with the stored target position and/or the target orientation by means of the electrical controller. Errors and deviations in the positioning of the sensor device are thus able to be detected rapidly and while still at the installation and fitting location, and can be rapidly and simply corrected. A further closure of the traffic route or a further journey for an installer or fitter is no longer necessary.

In a particularly advantageous configuration of the sensor device, of course as much data regarding the target position and the target orientation as possible is stored in the electronic data memory and can then be compared with a particularly large amount of determined data regarding the actual position and the actual orientation.

The electronic data memory for this can be a component that is integrated within the sensor device or a component that can be separated, for example in the form of a USB stick on which in this case for example target positions and/or target orientations of one or a plurality of sensor devices can be stored. It is thus possible, for example, to store all target positions and/or target orientations of the sensor devices that are to be used for a crossing for example on a single external electronic data memory. During assembly, said memory is connected to the rest of the respective sensor device by means of a suitable interface, for example a USB port, and at said time is part of the respective sensor device.

Of course, all other types of electronic data memory are also conceivable. Thus it can for example be advantageous if the sensor device has access to an electronic data memory that is located at a central location for example. The access to the data stored in the electronic data memory can then for example be carried out by means of a radio link or a cellular network, so that no physically present electronic data memory is disposed in the actual sensor device that is mounted on the respective traffic route, but the sensor device only has access to such a data memory by means of suitable communications means. Within the scope of the present invention, this also corresponds to a sensor device comprising an electronic data memory.

The target orientation preferably comprises a target elevation angle and a target azimuth angle and the at least one determination device is configured to determine an actual elevation angle and/or an actual azimuth angle and/or an actual tilt angle. In this case the elevation angle is an angle that describes the tilt of the sensor for example in an X-Z plane, which consequently runs vertically. For determining the actual elevation angle, for example a tilt sensor can therefore be used that measures the tilt of the sensor, for example relative to a horizontal. The actual elevation angle that is thus determined is compared in the electrical controller with a target elevation angle that is stored in the electronic data memory.

An azimuth angle is understood to mean an angle of orientation of the sensor device, for example in the X-Y plane, which consequently runs horizontally. Said angle can for example be determined relative to the North direction with a compass and/or a magnetometer.

The actual tilt angle describes a tilt of the sensor about the longitudinal axis of the respective beam lobe. In particular, in the case in which the transmitted beam lobe and/or the received beam lobe are not formed rotationally symmetrically about the longitudinal axis thereof, said tilt angle is of interest in order to ensure that the non-rotation symmetrical beam lobe of the region of the traffic route to be monitored is incident and illuminates in the optimum manner or the non-rotation symmetrically formed reception lobe can capture the reflected radiation in an optimal manner. The value of the actual tilt angle is accordingly compared with a target tilt angle, which is 0° as a general rule. In particular situations, it can however also be useful to provide a target tilt angle that is different from 0°. The comparison of the actual tilt angle with the target tilt angle proceeds similarly to the comparison of the other actual angles with the corresponding target angles.

Of course, other angles relative to other reference planes or lines are also conceivable, as long as the orientation of the sensor device can be uniquely described by the three independent angles.

In a preferred configuration, the at least one determination device comprises a compass and/or a magnetometer for determining the actual azimuth angle. Said thus determined actual azimuth angle can then be compared by means of the electrical controller with a target azimuth angle that is stored in the electronic data memory.

In a particularly preferred configuration, in addition to the aforementioned information, information about different sub regions, in particular vehicle lanes, of the part of the traffic route or expected trajectories are stored in the electronic data memory of the sensor device, of which it is expected that at least some of the road users will move at least roughly along said expected trajectories. Of course, both information about different sub regions, in particular vehicle lanes, and also expected trajectories can be stored.

To determine the target position and/or the target orientation, a three-dimensional model of the traffic route to be monitored, for example a road crossing, is commonly produced and the optimal target position and/or optimal target orientation is/are determined using said model. If information, for example about the course of the vehicle lanes relative to the target position and/or target orientation, is now stored in the electronic data memory, road users whose trajectories in space deviate significantly from the course of the stored vehicle lanes can be detected and for example their progress on the part of the traffic route to be monitored can be recorded. For this purpose, for example a separate optical camera can be provided that can be activated when required.

In addition or alternatively to said information about vehicle lanes or other sub regions of the traffic route to be monitored, expected trajectories can also be stored in the electronic data memory. An expected trajectory is understood to be the expected movement of at least some of the road users in this case, which for example is stored in a parameterized form in the electronic data memory. Said expected trajectories correspond as a rule to a movement of the road users along existing vehicle lanes for example. Here it is also possible to identify random road users whose actual trajectories in space deviate markedly from expected trajectories. In this case it is conventionally expected that a road user moves around in a relatively narrow region around the expected trajectory, at least over a long period of time, if for example he follows a lane of the traffic route. Situations such as for example changing vehicle lanes can be detected in this way and divided into different scenarios. An expected trajectory can also be defined in the form of a region within which the road user is probably moving. Said region can for example coincide with one or a plurality of vehicle lanes of the traffic route.

Advantageously, the electrical controller is configured to determine an actual trajectory from the data of a plurality of road users detected at different points in time, to compare the same with the expected trajectories or the information about different sub regions, in particular vehicle lanes, of the part of the traffic route and to determine a deviation of the actual elevation angle from the target elevation angle and/or a deviation of the actual azimuth angle from the target azimuth angle from the result of said comparison.

As a rule, road users are detected multiple times by a sensor device described here while they are moving on the part of the traffic route to be monitored. Thus different positions of individual road users are obtained at different points in time, which can be combined by the electrical controller into an actual trajectory, along which the respective road user is actually moving. Said actual trajectories can now for example be compared with the additional information about the part of the traffic route, for example vehicle lanes. If for example it turns out that a large proportion of the detected road users are not moving essentially parallel to the stored vehicle lanes, but are maintaining a broadly constant angle to said vehicle lanes, information can be derived therefrom about the actual azimuth angle. If the sensor device is in the target position and the target orientation thereof, the detected road users must be moving along the vehicle lanes or the expected trajectories. A movement of the road users that deviates from the vehicle lanes or expected trajectories, for example in the same plane as the vehicle lanes or expected trajectories, but at an approximately constant angle thereto, wherein the angle is not 0°, is an indication of a deviation of the actual azimuth angle from the target azimuth angle.

If the comparison of the actual trajectories with the stored lanes or the expected trajectories indicates that a more or less constant angle is detected between the actual trajectories and the stored data, which for example lies in an X-Z plane, this is a strong indication of a deviation of the actual elevation angle from the target elevation angle.

It is consequently possible, solely from the comparison of the calculated actual trajectories with the stored information about the traffic route or the expected trajectories, to make statements about a comparison of the actual orientation with the target orientation of the sensor device without having to have separate components for this in the form of sensors, compass or similar equipment. Part of the electrical controller in said configuration is for the determination device, so that the number of components used in said configuration of the sensor device is significantly reduced.

If a deviation of the actual position from the target position and/or a deviation of the actual orientation from the target orientation is determined, the actual position and/or the actual orientation of the sensor device do not necessarily have to be changed. For example, an aperture angle of the transmission beam transmitted by the transmitting and receiving device is often greater than the aperture angle that is necessary to cover the desired region. In this case, a change of the actual position and/or the actual orientation is not necessary, because the desired region of the traffic route may not be covered by the expected central region of the aperture angle of the transmitting and receiving device, but for example by a region of the aperture angle that is shifted relative to said region. An exemplary transmitting and receiving device has an aperture angle that extends from −20° to +20° about a primary transmission axis. The same can for example be in a conical form and thus rotationally symmetrical about said longitudinal axis. If such a transmitting and receiving device is disposed in the target position and the target orientation of the sensor device, for example this results in a transmission beam that is transmitted in a region of −15° to +15° about the central axis covering the region of the traffic route to be monitored. However, if for example the transmitting and receiving device is disposed so as to be offset by a few degrees from the target orientation, in particular with an offset azimuth angle, said actual orientation does not necessarily have to be corrected. Rather, the transmission region required for coverage and monitoring of the desired region of the traffic route can also be shifted, so that the transmission beam in an angular region of −15° to +15° about the central transmission axis is no longer used for the monitoring of the traffic route but for example a transmission beam in a region of −10° to +20° is used. Such a change is conceivable in a purely electronic way and thus as a software solution. In this case, neither the shape of the transmitted beam lobe nor of the received beam lobe is changed, but only a different, shifted angular region is transformed for analysis.

It is also possible, following the determination of the deviation of the actual position from the target position and/or the actual orientation from the target orientation, to change the data concerning vehicle lanes or expected trajectories that is stored in the electronic data memory such that they coincide with the actual conditions again. This can also be carried out in an electronic way during a software change.

A transmitting and receiving device often comprises beam-shaping components, so that for example by a change of the activation of said components the transmission cone and/or reception cone of the transmission beam transmitted by the transmitting and receiving device can be changed and shaped. The change of the received beam lobe can also be carried out without additional components by subjecting the received signals to mathematical operations. In particular, phase shifts can be produced and used in numerical ways. Correction of deviations of the actual position from the target position and/or the actual orientation from the target orientation can also be compensated by this type of beam shaping.

The electrical controller is preferably configured to output a deviation of the actual position from the target position and/or a deviation of the actual orientation from the target orientation to an output device, in particular a display. In this way it is particularly simply possible for the fitter and installer to recognize and possibly carry out the required corrections for the actual position and/or the actual orientation. Of course, information that is output by the electrical controller can also be stored for documentation purposes for example.

The sensor device preferably comprises at least one acceleration sensor, with which an acceleration of the sensor device can be measured in at least one spatial direction, preferably in two or three mutually independent spatial directions. For example, such accelerations can occur if the sensor device is disposed on a mast that is subjected to high winds, for example. In this case fluctuations of the mast occur, which of course are transmitted to the sensor device that is fitted thereto and which thus affect the measurement result of the sensor device. As already stated, the sensor device transmits a transmission beam that is reflected by the road user to be detected and collected again by the sensor device. In order to be able to determine the distance of the road user from the sensor device, it is necessary to know the propagation speed of the transmission beam and to measure the time interval between the transmission of the transmission beam and the reception of the reflected transmission beam. This of course requires that the position of the sensor device does not change or only changes in a negligible manner. In addition, it requires that the sensor device for example does not move or only moves in a negligible manner relative to the traffic route, for example to prevent the Doppler effect, which in particular can cause quite appreciable effects in the case of the use of ultrasonic waves as the transmission beam. If as a result an acceleration in at least one spatial direction that lies above a predetermined limit value is determined by the at least one acceleration sensor, this can for example be taken into account during the analysis of the measurement data. Alternatively or additionally, such a large acceleration can result in the electrical controller switching off the sensor device or no longer analyzing the collected transmission beam.

BRIEF DESCRIPTION OF THE DRAWINGS

Using the accompanying figures, an exemplary embodiment of the present invention is described in detail below. In the figures:

FIGS. 3 a and b show the schematic representation of a correct elevation angle (FIG. 3a) and of an incorrect (FIG. 3b) elevation angle.

DETAILED DESCRIPTION THE INVENTION

Figure 1:
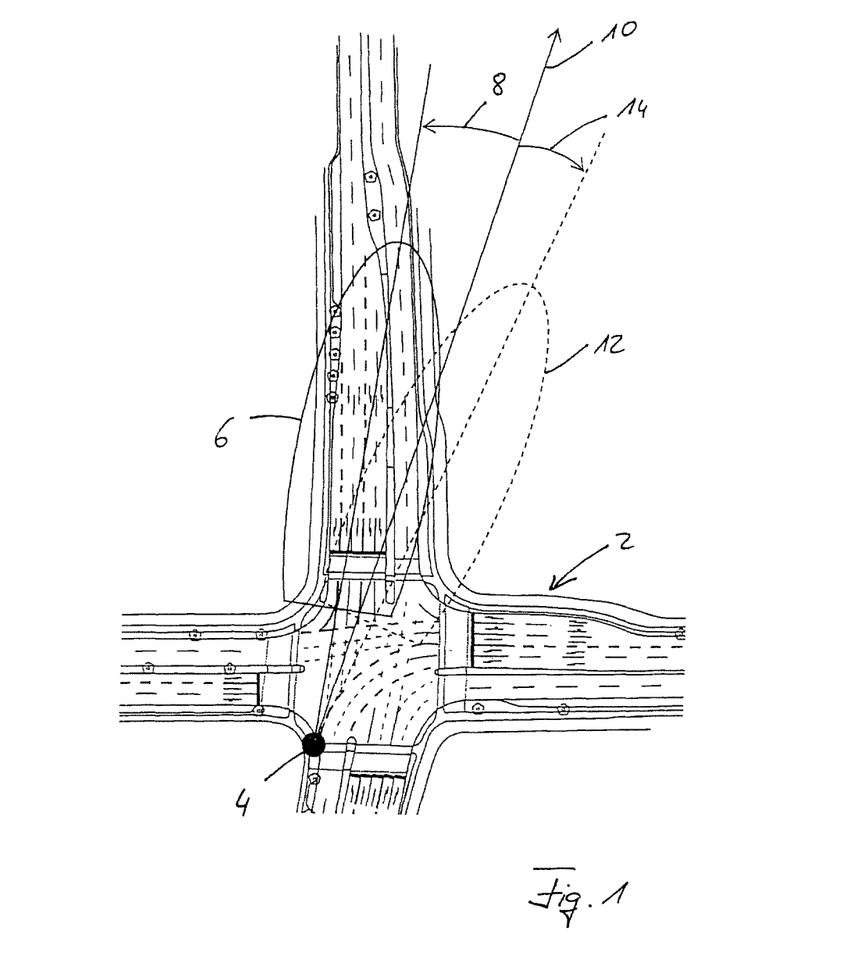
FIG. 1 shows the schematic representation of a crossing with a sensor device.

FIG. 1 shows a schematic top view of a crossing 2 at which a sensor device 4 is disposed in an actual position. With the positioning represented in FIG. 1, the sensor device 4 is located in an actual position that is identical to the target position. A target detection region 6 is represented by a solid line that deviates by a target azimuth angle 8 from a North direction 10. Of course, the target azimuth angle 8 can also be determined relative to any other preferred direction.

It can be seen in FIG. 1 that the target detection region 6 covers a part of the crossing 2 in an almost optimal manner. Said target detection region 6 has been determined in advance, for example using a three-dimensional model.

By contrast, an actual detection region 12 that is represented with dashed lines deviates from the North direction 10 by an actual azimuth angle 14.

It can already be seen in FIG. 1 that the actual detection region 12 covers a region of the crossing 2 that is significantly different from the target detection region 6. Thus for example vehicles traveling in said direction on the road running from above to below in FIG. 1 only enter the actual detection region 12 of the sensor device 4 very late, whereas they would be detected much earlier in the target detection region 6.

Figure 2:
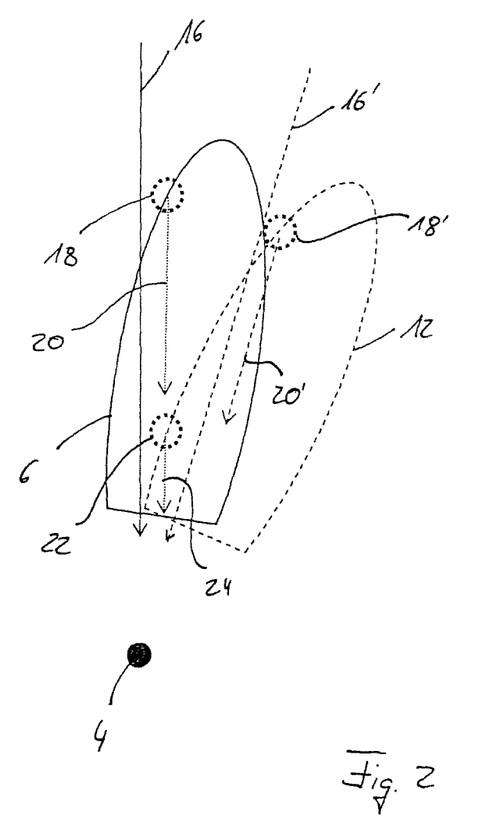
FIG. 2 shows the schematic representation of a deviation in azimuth angle.

FIG. 2 shows the same situation as FIG. 1, wherein for more clarity the crossings 2 are not represented. Also in FIG. 2, consequently the sensor device 4, the target detection region 6 and the actual detection region 12 are represented. However, whereas in FIG. 1 the target azimuth angle is shown and is known, FIG. 2 shows a sensor device 4, the electronic data memory of which does not have to hold the target azimuth angle 8. Rather, further information about the crossing 2 to be monitored is stored in the electronic data memory.

Said information includes for example an expected trajectory 16. Said expected trajectory corresponds to the expected direction of travel or even the expected path of most road users that pass into the target detection region 6. The expected trajectory 16 corresponds in the direction thereof to the direction of the lanes of the crossing 2 represented in FIG. 1.

A road user, for example a motor vehicle, that is travelling on the right side of the road on one of the vehicle lanes represented in FIG. 1 on the road running from top to bottom in FIG. 1, enters the target detection region 6 at an expected entry point 18 that is represented by a dashed circle. It is moving along the lane trajectory 20, which for example can also have been stored in the electronic data memory, for example in a parameterized form. Alternatively or additionally, the lane trajectory 20 for this is an actual trajectory that has been calculated by the sensor device 4 and the electronic controller contained therein from different measurement data for a road user. It can be seen that the lane trajectory 20 runs parallel to the expected trajectory 16.

If the sensor device 4 is indeed in the target position, but not mounted in the target orientation, this results in a deviation of the actual detection region 12 from the target detection region 6 that is already represented in FIG. 1. As in FIG. 1, there is also a deviation in the azimuth angle for the situation represented in FIG. 2. This has a whole series of different effects. For one thing, a motor vehicle that is moving on the right side of the road along the vehicle lanes represented in FIG. 1 from top to bottom, enters the actual detection region 12 significantly late. This takes place at an actual entry point 22. As with the lane trajectory 20', the expected trajectory 16' and the expected entry point 18' are stored in the electronic data memory as additional information about the region of the crossing 2 that is to be monitored. Said region consequently has the same deviation in azimuth angle as the actual detection region 12. A motor vehicle or other road user that is travelling on the aforementioned lane now enters the actual detection region 12, as already described, at the actual entry point 22 and travels therein along an actual trajectory 24. This too runs straight, but is shorter than expected from the additional information about the crossing 2 that is stored in the electronic data memory and does not run parallel to the expected trajectory 16' or to the lane trajectory 20'. An angle is enclosed between the lane trajectory 20' and the expected trajectory 16' on one side and the actual trajectory 24 on the other side that exactly corresponds to the deviation between the actual azimuth angle 14 and the target azimuth angle 8. Consequently, by the determination of the actual trajectory 24 and corresponding trajectories averaged over a number of detected road users, the difference between the actual azimuth angle 14 and the target azimuth angle 8 can be determined, and because the target azimuth angle 8 is known, the actual azimuth angle 14 can also be calculated.

The sensor device 4 can then suggest a suitable correction of the actual orientation of the sensor device 4, for example on a display device, for example a display, that is not represented.

Figure 3A:
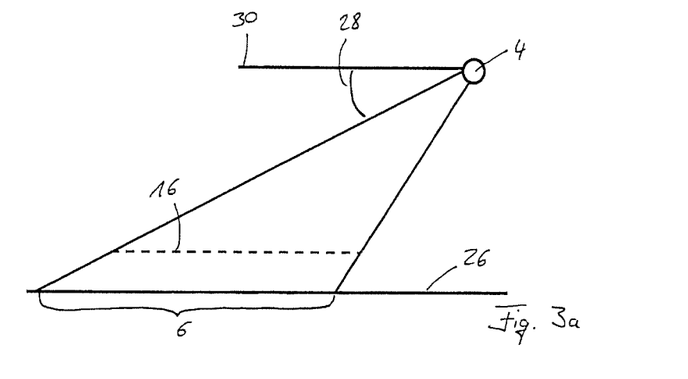

In FIG. 3a, a highly simplified representation of the sensor device 4 in the target position thereof and the target orientation thereof is shown. In this case, the sensor device 4 is disposed above a road 26, of which the target detection region 6 is detected. An expected trajectory 16 is contained in the electronic data memory of the sensor device 4 as additional information about the part of the traffic route to be monitored. This is shifted upwards parallel to the road 26 in the exemplary embodiment shown, and thus takes account of the average height of an expected road user. Because said sensor device 4 is perfectly disposed in the target position and the target orientation in FIG. 3a, said expected trajectory 16 coincides with an actual trajectory that is not represented in FIG. 3a.

Figure 3B:
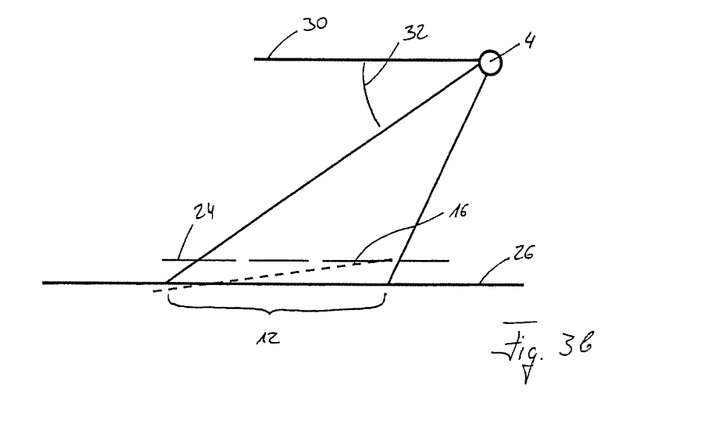

FIG. 3b shows the situation in which the sensor device 4 is indeed disposed in the target position, but not in the target orientation. In contrast to the situations represented in FIGS. 1 and 2, there is however a deviation in the elevation angle in FIG. 3b. Whereas in FIG. 3a a target elevation angle 28 is represented that is measured relative to a horizontal 30, FIG. 3b shows a situation in which there is an actual elevation angle 32 relative to the horizontal 30 that is greater than the target elevation angle 28.

This results on the one hand in the actual detection region 12 not only being shifted relative to the target detection region 6, but also being reduced. In addition, the expected trajectory 16 that is stored as additional information for the part of the traffic route that is to be monitored no longer runs parallel to the road 26, so that a road user that is travelling along the actual trajectory 24 parallel to the road 26 is not following the expected trajectory 16. Rather, the expected trajectory 16 and the actual trajectory 24 intersect at an angle that lies in an xz plane, and consequently therefore in a plane perpendicular to the road 26, and exactly corresponds to the deviation between the target elevation angle 28 and the actual elevation angle 32. In this way, the actual elevation angle can consequently be determined from the knowledge of the target elevation angle 28 and said deviation can be determined as described above. This is carried out by the electrical controller, which suggests an appropriate correction of the actual orientation of the sensor device 4, for example on an output device.

REFERENCE CHARACTER LIST 2 crossing
4 sensor device
6 target detection region
8 target azimuth angle
10 North direction
12 actual detection region
14 actual azimuth angle
16, 16' expected trajectory
18, 18' expected entry point
20, 20' lane trajectory
22 actual entry point
24 actual trajectory
26 road
28 target elevation angle
30 horizontal
32 actual elevation angle

The invention claimed is:

1. A sensor device that is configured to detect road users on a part of a traffic route, comprising:
 a transmitting and/or receiving device for transmitting and/or receiving a transmission beam; and
 at least one determination device for determining an actual position and/or an actual orientation in which the sensor device is disposed,
 an electrical controller configured to compare the actual position and/or the actual orientation of the sensor with a target position and/or target orientation of the sensor to provide data for changing the actual position and/or actual orientation of the sensor to correspond with a target position and/or target orientation of the sensor; and
 an electronic data memory which stores information about different sub regions of at least part of the traffic route or expected trajectories of which at least some road users travel along,
 wherein the sensor device is positioned in a target position above or next to the traffic route,
 wherein the electrical controller is configured
  to determine an actual trajectory from data representing a plurality of road users detected at different points in time,
  to compare said actual trajectory with the expected trajectories or with the information about different sub regions of the at least part of the traffic route, and
  to determine a deviation of the actual elevation angle from the target elevation angle and/or a deviation of the actual azimuth angle from the target azimuth angle from a result of said comparison, and
 wherein the target orientation compared by the electrical controller comprises a target elevation angle and a target azimuth angle and wherein the at least one determination device is configured to determine an actual elevation angle and/or an actual azimuth angle and/or an actual tilt angle.

2. The sensor device as claimed in claim 1, wherein the at least one determination device is a global positioning system (GPS) module for determining the actual position.

3. The sensor device as claimed in claim 1, further comprising a provision device for providing the actual position and/or the actual orientation of the sensor for further processing.

4. The sensor device as claimed in claim 1, wherein the electrical controller is configured to obtain the target position and/or the target orientation from an electronic data memory.

5. The sensor device as claimed in claim 4, wherein the electronic data memory is part of the sensor device.

6. The sensor device as claimed in claim 1, wherein the at least one determination device comprises a compass and/or a magnetometer for determining the actual azimuth angle.

7. The sensor device as claimed in claim 1, wherein the electrical controller is configured to output a deviation of the actual position of the sensor from the target position and/or a deviation of the actual orientation of the sensor from the target orientation to an output device.

8. The sensor device as claimed in claim 1, further comprising at least one acceleration sensor with which an acceleration of the sensor device can be measured in at least one spatial direction.

9. The sensor device as claimed in claim 8 wherein said at least one acceleration sensor measures acceleration of the sensor device in at least two or three mutually independent spatial directions.

10. The sensor device as claimed in claim 1 wherein the different sub regions represent different lanes in the traffic route.

11. The sensor device as claimed in claim 7 wherein the output device is a display.

12. A road-monitoring sensor device that is configured to detect errors and deviations in its own position and/or orientation reducing detection of road users on a part of a traffic route, comprising: a transmitting and/or receiving device for transmitting and/or receiving a transmission beam; and at least one determination device for determining an actual position and/or an actual orientation in which the sensor device is disposed, an electrical controller configured to compare the actual position and/or the actual orientation of the sensor with a target position and/or target orientation of the sensor to provide data for changing the actual position and/or actual orientation of the sensor to correspond with a target position and/or target orientation of the sensor; and an electronic data memory which stores information about different sub regions of at least part of the traffic route or expected trajectories of which at least some road users travel along, wherein the sensor device is positioned in a target position above or next to the traffic route, wherein the electrical controller is configured to determine an actual trajectory from data representing plurality of road users detected at different points in time, to compare said actual trajectory with the expected trajectories or with the information about different sub regions of the at least part of the traffic route, and to determine a deviation of the actual elevation angle from the target elevation angle and/or a deviation of the actual azimuth angle from the target azimuth angle from a result of the comparison, deviation being treated as an error reducing a detection region, and to provide for correction of the error, wherein the target orientation compared by the electrical controller comprises a target elevation angle and a target azimuth angle and wherein the at least one determination device is configured to determine an actual elevation angle and/or an actual azimuth angle and/or an actual tilt angle.

13. The road-monitoring sensor device of claim 12, wherein the electrical controller is configured to provide for correction of the error by outputting the deviation of the actual position from the target position and/or the deviation of the actual orientation from the target orientation to an output device.

14. The road-monitoring sensor device of claim 12, wherein the transmitting and/or receiving device comprises beam-shaping components, and wherein the electrical controller is configured to provided for correction of the error by changing activation of the beam-shaping components.

* * * * *